US011528890B1

(12) United States Patent
Munroe et al.

(10) Patent No.: US 11,528,890 B1
(45) Date of Patent: Dec. 20, 2022

(54) DEVICE AND METHOD FOR TRAINING ANIMALS

(71) Applicant: CAP Acres, LLC, Cumberland, ME (US)

(72) Inventors: Thomas Munroe, Cumberland, ME (US); Edward Russell, Cumberland, ME (US)

(73) Assignee: CAP Acres, LLC, Cumberland, ME (US)

( * ) Notice: Subject to any disclaimer, the term of this patent is extended or adjusted under 35 U.S.C. 154(b) by 0 days.

(21) Appl. No.: 17/125,078

(22) Filed: Dec. 17, 2020

Related U.S. Application Data

(60) Provisional application No. 62/948,948, filed on Dec. 17, 2019.

(51) Int. Cl.
| | | |
|---|---|---|
| *A01K 15/00* | (2006.01) | |
| *A01K 15/02* | (2006.01) | |
| *B68B 1/00* | (2006.01) | |
| *A01K 27/00* | (2006.01) | |

(52) U.S. Cl.
CPC ............ *A01K 15/02* (2013.01); *A01K 27/003* (2013.01); *A01K 27/005* (2013.01); *B68B 1/00* (2013.01); *B68B 2001/006* (2013.01)

(58) Field of Classification Search
CPC ........ A01K 15/00; A01K 15/02; A01K 27/00; A01K 27/003; B61B 1/00; D07B 1/16; B68B 2001/006
USPC ................................................ 54/71; 119/799
See application file for complete search history.

(56) References Cited

U.S. PATENT DOCUMENTS

| | | | | |
|---|---|---|---|---|
| 3,669,133 A | * | 6/1972 | Hyman | .................... A45B 9/00 135/45 |
| 8,967,087 B2 | * | 3/2015 | Church | ................... A01K 27/00 |
| 2004/0262353 A1 | * | 12/2004 | Lambert | .................... B62J 7/00 224/578 |
| 2014/0076244 A1 | * | 3/2014 | Byrne | .................... A01K 27/00 |
| 2015/0020753 A1 | * | 1/2015 | Gracia | ................. A01K 27/003 119/795 |
| 2016/0309683 A1 | * | 10/2016 | Summers | ............. A01K 27/003 |

* cited by examiner

*Primary Examiner* — Joshua J Michener
*Assistant Examiner* — Henry Hooper Mudd
(74) *Attorney, Agent, or Firm* — Ascentage Law, PLLC

(57) ABSTRACT

An improved lunging tool utilized to train animals, such as horses. The lunging tool includes a stiffening component inserted into an internal pocket of the body. The lunging tool is configured to attach to a harness or halter on one end and a lunging line or rope on the other end to enable a trainer to lead the animal by both pushing and pulling on the animal. The length of the stiffening component of the improved lunging tool prevents entanglement with the animal's legs if the trainer drops the improved lunging tool.

16 Claims, 6 Drawing Sheets

DEVICE AND METHOD FOR TRAINING ANIMALS

FIELD OF THE INVENTION

The present invention relates generally to a device for assisting in the training of animals and to a method of training animals.

BACKGROUND OF THE INVENTION

Lunging lines are often used in training animals, such as horses. The lunging line is attached to a harness, halter or collar worn by the animal and enables a trainer to lead the animal by pulling on the lunging line.

One problem with lunging lines is that lines only allow the trainer to lead the animal by pulling on the line and a user is unable to use a traditional lunge line to push on the animal to change the animal's direction of movement. A second problem with lunging lines is that lunging lines often tangle in the legs of the animal or get tangled around the trainer, which can spook the animal and potentially cause harm to the animal or trainer.

An additional problem with lunging lines is that the lines do not prevent or reduce the frequency of animal leaning inward toward trainer.

The present application seeks to solve at least the above identified problems.

SUMMARY OF THE INVENTION

In one embodiment of the invention a device utilized for training or exercising an animal, the device comprises a body having a first end and a second end, wherein the body includes an internal pocket for a stiffening component to be disposed within. On the first end of the body a bolt snap is attached and on the second end a ring is attached. The stiffening component can have varying cross-sectional shapes such as cylindrical, circular, triangular, square, hexagonal, octagonal or other such shapes. The stiffening component generally has a length between three feet to nine feet, but preferably five to seven feet in length.

In one embodiment the internal pocket has a slit that is positioned near one end of the internal pocket, but offset enough that when the stiffening component is inserted into the internal pocket through the slit a portion of the internal pocket on one end still covers the end portion of the stiffening component.

In one embodiment the body is formed of a nylon webbing material. In other embodiments the body is formed of other webbing materials such as cotton, polyester, polymer-based, or plant-based materials.

In the embodiment above the bolt snap is configured to attach to a clip of a harness or halter worn on an animal that is being trained. The animal can be a horse, a donkey, a mule, a camel, a llama, a sheep, an alpaca, or even a dog.

In one embodiment the ring is a D-ring and is configured to attach to a lunge line, leash or rope.

In another embodiment the stiffening component is configured to have an elongated state and folded stated, whereby in the folded state the stiffening component is comprised of individually separable sections. In a variation of this embodiment an elastic cord is disposed between each of the sections of the stiffening component.

The internal pocket of the body can be provided with reinforced stitching to ensure that the stiffening component does not wear through when being pushed on.

In another embodiment a lunge tool is utilized for training or exercising an animal, the device comprises a body having a first end and a second end; a stiffening component disposed within an internal pocket of the body; a bolt snap attached to the first end of the body that is configured to be attached to a harness or halter worn on the animal; a ring attached to the second end of the body; and a lunge line, leash or rope connected to the ring, and wherein the stiffening component is comprised of multiple sections and configured to be in an elongated state or separated into a folded or compact state.

In yet another embodiment, a method for training an animal includes the steps of: 1) attaching a first end of a lunging tool to a harness or halter being worn by the animal, wherein the lunging tool comprises: a body having a first end and a second end, a stiffening component disposed within an internal pocket of the body, a bolt snap attached to the first end, and a ring attached to the second end; 2) attaching a second end of the lunging tool to a lunge line, a leash or a rope; 3) holding the lunge line, leash or rope; and 4) guiding the animal around an area using the lunging tool, wherein guiding the animal around includes pulling on the lunging tool when necessary and pushing on the lunging tool when necessary.

In the method above, the stiffening component is rigid enough to transfer the force from the pushing motion to the harness or halter worn by the animal, such that the animal feels the pushing motion.

The method and lunging tool described above enable a trainer to pull on the lunging tool when needed or to push on the lunging tool when needed.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE DRAWINGS

One method of training or exercising animals, such as horses, is lunging. Lunging is a technique where an animal is tethered to a trainer via a long line, referred to as a lunge line. The animal is worked in a circular movement with a person or trainer guiding the animal using the lunge line, voice commands, and possibly a whip or other equipment.

Lunging is beneficial to animals being trained in that it is used to teach the animal to respond to voice commands and body language, to get accustomed to wearing a saddle and bridle, and to the feel of reins and bit pressure. Lunging may also be used with a new rider on the animal, allowing the rider to get accustomed to sitting in a saddle without worrying about steering or guiding the animal.

The typical lunge line is a long line that is typically 20-30 feet in length. It is often a flat woven webbing made of cotton, nylon, or other suitable material. Alternatively, the lunge line may be a shorter round rope. The lunge line may have a buckle, snap, or chain that may be attached to the bridle, halter, or reins.

The trainer or person wielding the lunge line uses the line and voice commands to guide the animal around an area. The line is used to pull on the animal to guide its movements in the direction that the animal is pulled. However, because the lunge line is a line or rope, the lunge line may only be used to pull on the animal and cannot be used to push on the animal or to stop the animal from charging forward until the lunge line is taught. Also, if the lunge line is dropped or dragged on the ground it may become entangled in the trainer's hands or feet or around the legs of the animal. This unnatural feeling can cause the animal to be spooked, which can lead to potential harming of the animal or others around the animal. It can also frustrate the training process.

Figure 1A:
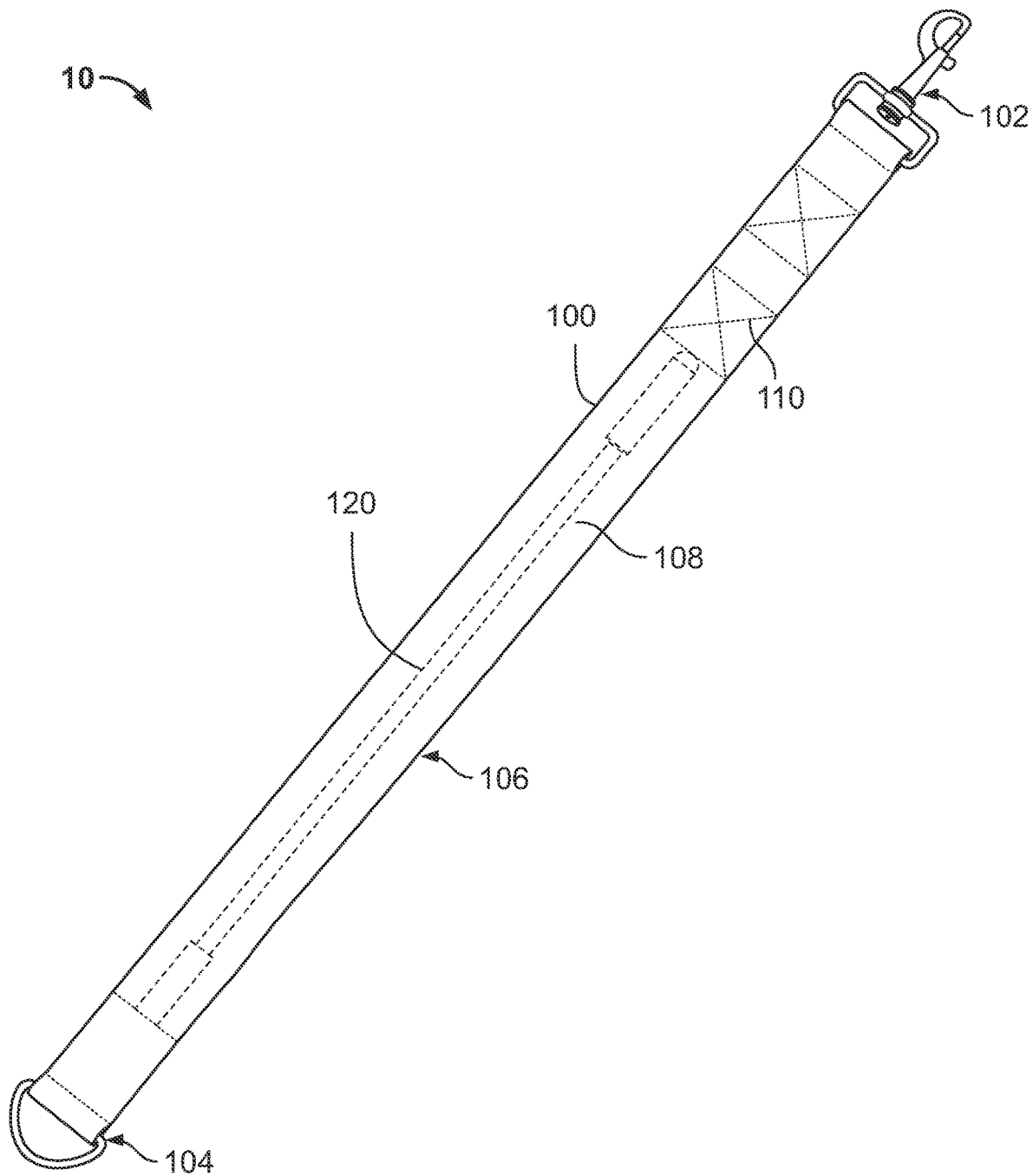
FIGS. 1A-B illustrate the body portion of a lunging tool.
Figure 1B:
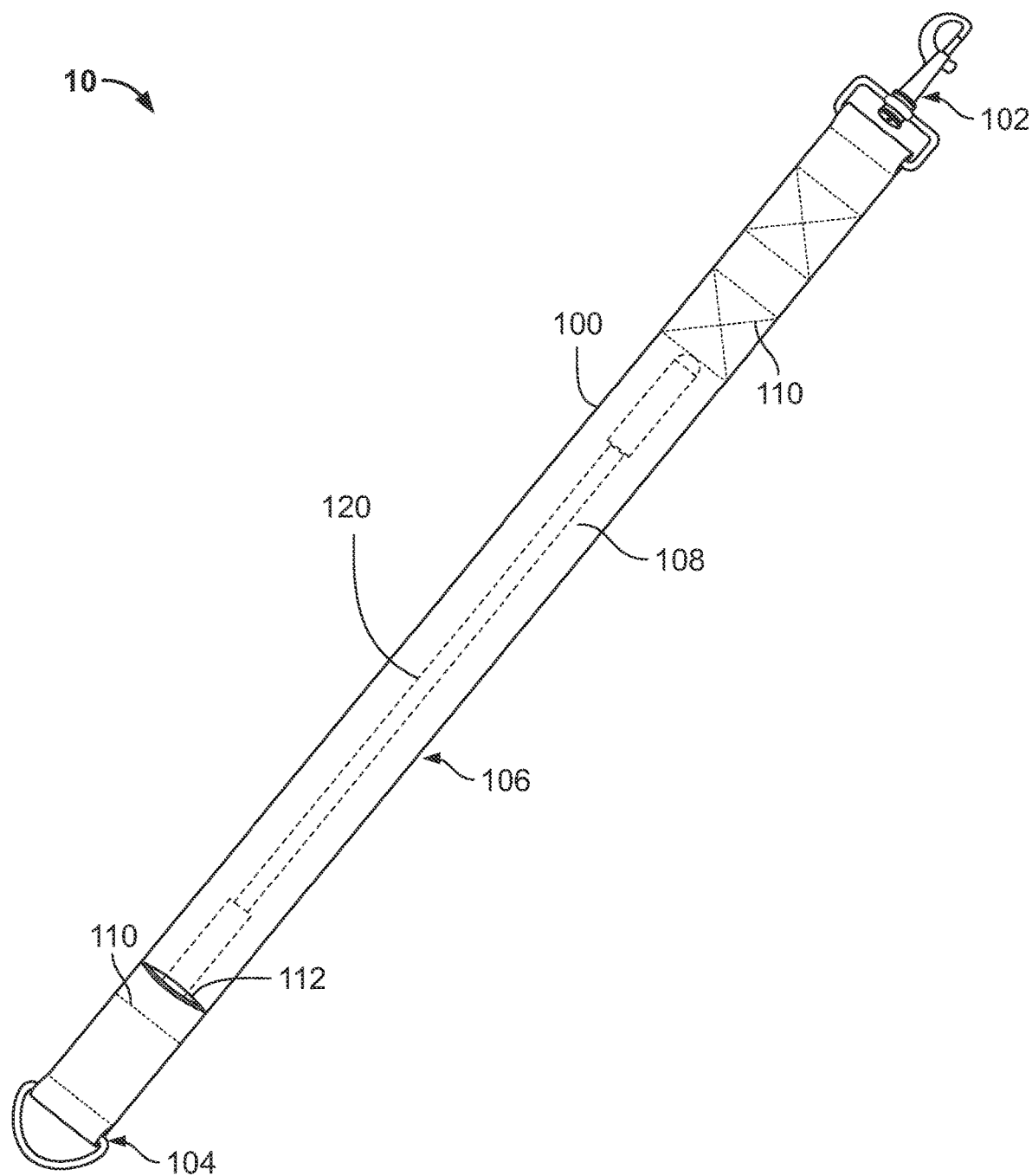
Figure 1C:
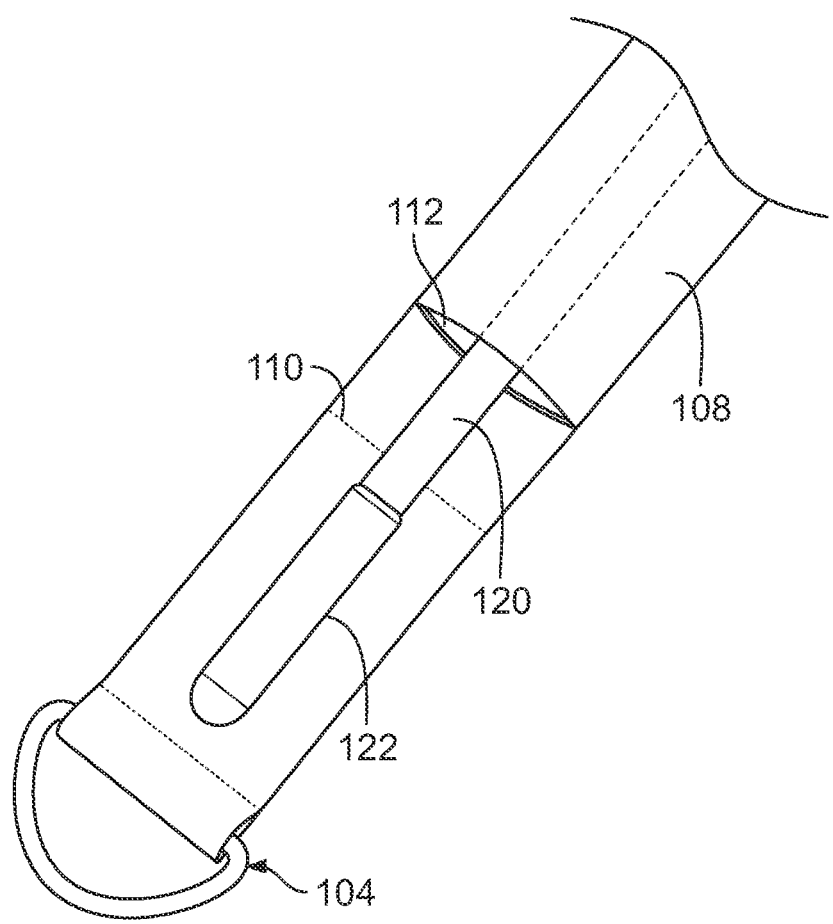
FIG. 1C illustrates a close up of one end of the body portion of the lunging tool, showing an inserted portion.

FIGS. 1A-C illustrate a new and improved lunging tool 10 that is utilized to train or exercise an animal. The lunging tool 10 has a body 100 having two ends. On one end of the body 100 is a connector 102, such as a bolt snap. On the other end of the body 100 is a ring 104, such as a D-ring made of a steel. The central portion of the body 100 can be made of a webbing 106 with various sections having reinforced stitching 110. An internal pocket 108 can be disposed within the central portion of the body 100 and configured to house a stiffening component 120, such as a stiffening rod. A slit or opening 112 can allow access to the internal pocket 108 where the stiffening component 120 can be inserted therein or removed therefrom.

Figure 2:
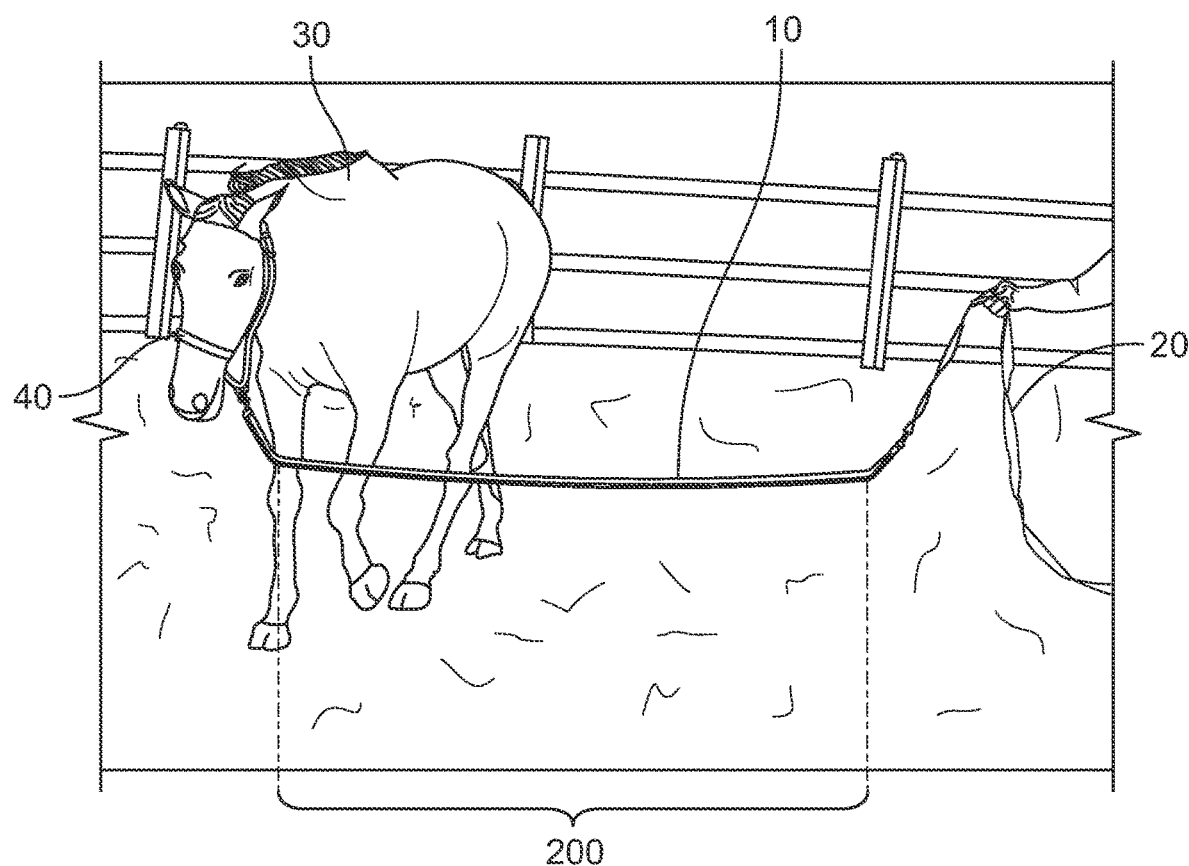
FIG. 2 illustrates the lunging tool system being utilized to train an animal.

The connector 102 is configured to be connected to a harness, reins, bridle, halter, or collar that is worn by an animal. The ring 104, which can be a D ring, can have additional lunge line 20 connected to it, such as shown in FIG. 2.

The webbing 106 can be made of multiple flexible materials, such as cotton or nylon. It is usually formed of interwoven strands of cotton or nylon, which form the webbing.

In one embodiment, the stiffening component 120 has a substantially cylindrical shape. Other suitable shapes may be used such as a rectangular shape, an octagonal shape, a hexagonal shape, or a triangular shape. The stiffening component 120 may be comprised of a fiberglass material that provides strength and flexibility. Other suitable materials include metal, wood, polymer materials, and plastics. The stiffening component can be formed to a length that is long enough to provide a suitable distance between the animal and the trainer and to prevent the body 100 from entangling with the animal's feet or legs. In various embodiments the stiffening component ranges between five feet in length and seven feet in length. However, it should be well understood that a shorter stiffening component, such as three feet could be used and a longer stiffening component such as nine feet could be used.

The internal pocket 108 can have reinforced stitching 110 provided at either end to allow for the pushing one end of the lunge tool 10. The slit or opening 112 can be positioned near an end of the internal pocket, but not at the very end of the internal pocket 108 to allow for the tip or end 122 of the stiffening component to be covered when inserted. This shorter section of the internal pocket can be folded over the tip or end portion 122 of the stiffening component 120.

In the embodiment shown in FIGS. 1A-C, the webbing 106 is shown as flat webbing comprised of one or more interwoven strands or threads of material. The webbing has various sections that are reinforced with stitching. The stitching may also be any suitable material, for example nylon or cotton. For example, the webbing may be approximately 2 inches in width and have a 5500-pound breaking strength.

In one embodiment the connector 102 is fixedly attached to the end of the body 100. The connector may be connected directly to a connection member of the harness, reins, bridle or halter 40. Alternatively, the connector 102 may be connected to a line or rope that is then connected to the harness, reins, bridle or halter 40

In one embodiment the connector 102 is connected to the webbing 106 and is not fixedly connected to the end of the body 100. In this embodiment, the webbing 106 holds the connector 102 in a position close to the end of the body 100, but the connector 102 may be pulled a small distance from the end of the body 100. The connector 102 may be connected directly to the harness, reins, bridle, or halter.

FIG. 2 illustrates the lunging tool being used to guide a horse 30. The lunging tool 10 is attached to a halter 40 that is worn by the horse 30. The lunging tool 10 is also attached to additional line 20. Line 20 may be a lunge line or a rope. The trainer uses the line 20 to pull on the horse or the trainer may use the lunge tool 10 to push on the horse. Furthermore, if the trainer drops the line 20, the body of the lunge tool 10 is dragged on the ground away from the horse 30 and because of the stiffness and length makes it very difficult for the horse's feet to get tangled up with it. The length 200 of the stiffening component is shown in FIG. 2.

Figure 3:
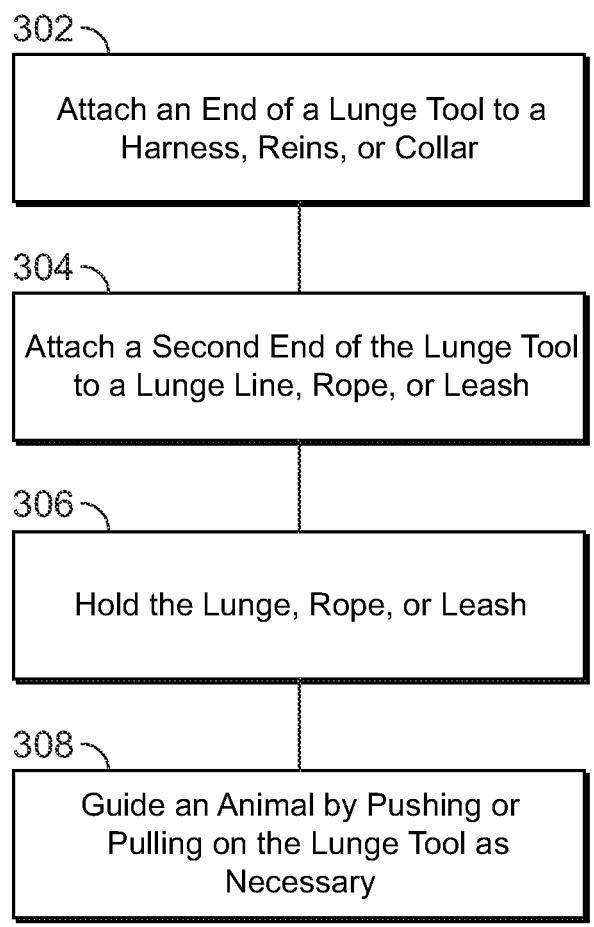
FIG. 3 illustrates a method of training an animal.

FIG. 3 is a flow chart illustrating a method of training an animal using the lunge tool. An end of a lunge tool is attached to a harness, reins, or collar that is worn by an animal (step 302). A second end of the lunge tool is attached to lunge line, rope, or leash (step 304). A user or trainer holds the lunge line, rope, or leash (step 306). The user or trainer guides the animal using the lunge tool by pulling the animal as needed or pushing the animal as needed (step 308). The trainer may also use voice commands or other equipment, such as a whip, to help guide and train the animal.

Figure 4A:
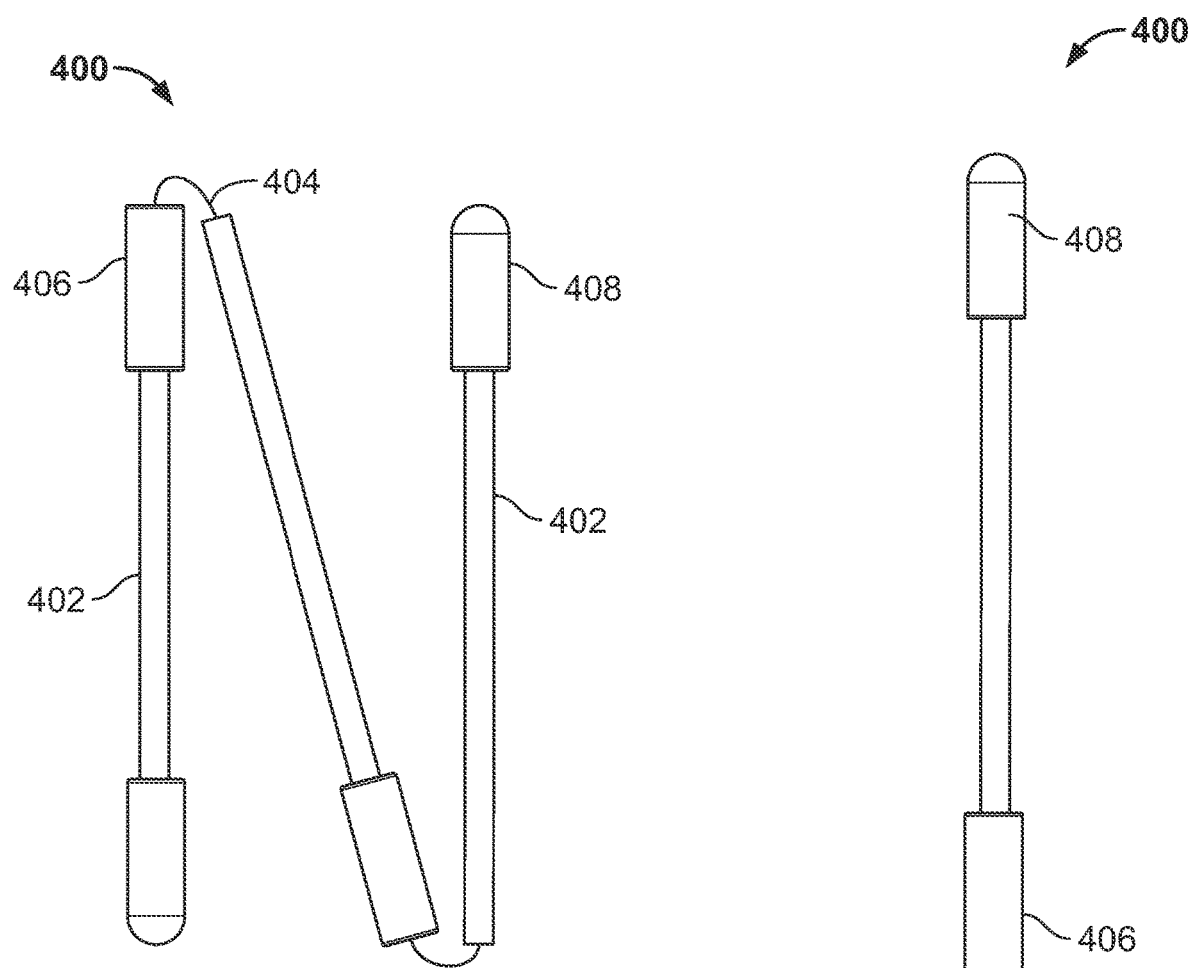
FIG. 4A illustrates an alternative internal stiffening component of the lunging tool comprising multiple sections in a folded state.

In the embodiments shown in FIGS. 1A-C, the stiffening component 120 is a unitary body, rod or pole. In an alternative embodiment shown in FIGS. 4A-B, the alternative stiffening component 400 comprises two or more rigid sections 402 that are configured to be connected to each other via connectors 406. In some variations a cord 404 runs through an internal channel of the sections 402 to help keep the sections together when in a folded or separated state. Cord 404 is provided for convenience when folding 400 for storing or otherwise not in use. Stiffening component 400 could still be separated into individual sections for storing, to provide a more compact lunging tool system again when not in use.

Figure 4B:
FIG. 4B illustrates the alternative internal stiffening component of FIG. 4A in an extended state.

Each section 402 can be formed of semi-rigid pole made of fiberglass, metal, or another suitable material. The primary objective is to provide a stiffness to the lunging tool 10, so that a pushing motion on the lunging tool can be transferred through the lunging tool 10 to the animal as noted above. Each of end sections 402 can be provided with end piece 408. End piece 408 can be formed of a rubber or plastic material and be slightly enlarged to provide a larger surface when being pressed against the internal sidewall of the internal pocket 108. In some variations, the connecting cord 404 can fixed to the end piece 408 and run through the length of each section 402 and fixed again at the opposite end piece 408. The cord 404 can have some elasticity to it, so that when assembled in an extended state, such as shown in FIG. 4B the cord 404 is still in tension or a taught state. This can partially assist in keeping together when stiffening component 400 is being pulled on. When 400 is being pushed the sections 402 will further press into connectors 406 and keep it together. Connectors 406 can include undersized holes or made from a material that grips or otherwise provides friction, so that when section 402 is inserted therein it fits snugly.

While the lunging tool has been described as being utilized to train a horse, the lunging tool can be utilized to train any suitable animal or mammal. For example, the lunging tool can also be used to train a donkey, a mule, an ox, a sheep, a camel, a llama, an alpaca, a pig, or a dog. Also, the lunging tool may be used to exercise an animal and is not limited to being used to train the animal. Furthermore, the lunging tool can be utilized to control an animal while a rider is sitting on the animal, allowing the rider to ride the animal without having to take control of the animal.

Also, the lunging tool can be utilized to train two animals/teams connected to each other. For example, training draft horses or oxen to pull and work in unison, pack animals are sometimes tied to other animals in a caravan or line to keep the pack animals together. The body of the lunging tool can be utilized to guide connected animals. In this use the body of the lunging tool can be of a shorter length, such as 1-3 feet in length.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A device utilized for training or exercising an animal, the device comprising:
   a body having a first end and a second end;
   a stiffening component disposed within an internal pocket of the body, wherein the stiffening component is configured to have an elongated state and folded stated, whereby in the folded state the stiffening component is comprised of individually separable sections, and wherein a connector is disposed between a first separable section and a second separable section, such that the connector is permanently fixed to one end of the first separable section and wherein the connector is configured to have one end of the second separable section press-fit therein, such that the first and second separable sections do not become separated during lunge training a horse;
   a bolt snap attached to the first end; and
   a ring attached to the second end.

2. The device utilized for training or exercising an animal of claim 1, wherein the stiffening component has a cylindrical cross-sectional shape.

3. The device utilized for training or exercising an animal of claim 1, wherein the internal pocket has a slit that is positioned near one end of the internal pocket, but offset enough that when the stiffening component is inserted into the internal pocket through the slit a portion of the internal pocket on end still covers the end portion of the stiffening component.

4. The device utilized for training or exercising an animal of claim 1, wherein the body is formed of a webbing material.

5. The device utilized for training or exercising an animal of claim 1, wherein the bolt snap is configured to attach to a clip of a harness or halter worn on an animal that is being trained.

6. The device utilized for training or exercising an animal of claim 1, wherein the animal is a horse, a donkey, a mule, a camel, a llama, a sheep, or an alpaca.

7. The device utilized for training or exercising an animal of claim 1, wherein the ring is a D-ring and is configured to attach to a lung line, leash or rope.

8. The device utilized for training or exercising an animal of claim 1, wherein at either end of the internal pocket reinforced stitching is provided.

9. A device utilized for training or exercising an animal, the device comprising:
   a body having a first end and a second end;
   a stiffening component disposed within an internal pocket of the body, wherein the stiffening component is comprised of multiple sections and configured to be in an elongated state or separated into a folded or compact state;
   a bolt snap attached to the first end of the body that is configured to be attached to a harness or halter worn on the animal;
   a ring attached to the second end of the body; and
   a lung line, leash or rope connected to the ring; and
   at least one connector disposed between each of the multiple sections, and configured to provide a press-fit between each connector and an end of each section connecting thereto, such that the press-fit connection and the disposal of the stiffening component within the internal pocket of the body prevents the multiple sections from disassembling during a lunge training with a horse.

10. The device utilized for training or exercising an animal of claim 9, wherein the stiffening component further includes an elastic cord disposed in an internal channel of each of the sections of the stiffening component.

11. The device utilized for training or exercising an animal of claim 9, where the stiffening component is at least 6 feet in length.

12. The device utilized for training or exercising an animal of claim 9, wherein the body further comprises an internal pocket having a length less than the total length of the body and configured to dispose the stiffening component therein.

13. The device utilized for training or exercising an animal of claim 12, wherein the internal pocket has a first end and a second end, and wherein a slit is formed along the length of the internal pocket near the first end, but offset sufficiently from the first end such that the internal pocket can be folded over an end portion of the stiffening component.

14. The device utilized for training or exercising an animal of claim 12, wherein the stiffening component has to be removed from the internal pocket in order to be separated into a folded or compact state.

15. The device utilized for training or exercising an animal of claim 9, wherein the device is configured to provide sufficient stiffness to both push and pull on a connected harness of horse, such that a horse can be trained during a lunging training exercise to experience being directed in multiple directions.

16. The device utilized for training or exercising an animal of claim 9, where the stiffening component is in a range of 5 to 7 feet in length, such that if the device is dropped it will not get tangled under a horse's legs.

\* \* \* \* \*